United States Patent [19]
Wade et al.

[11] Patent Number: 5,700,048
[45] Date of Patent: Dec. 23, 1997

[54] VAN CANOPY

[76] Inventors: D. Scott Wade; Richard L. Wade, both of 505 Buck Run Rd., Versailles, Ky. 40383

[21] Appl. No.: 560,797

[22] Filed: Nov. 21, 1995

[51] Int. Cl.$^6$ .................................................. E04H 15/06
[52] U.S. Cl. .................. 296/163; 135/88.05; 135/88.07
[58] Field of Search ........................... 296/163; 135/88.9, 135/88.05, 88.07, 88.1

[56] References Cited

U.S. PATENT DOCUMENTS

| | | | |
|---|---|---|---|
| 3,186,420 | 6/1965 | Magee | 135/88.07 |
| 3,720,438 | 3/1973 | Johnson et al. | 296/163 X |
| 3,743,345 | 7/1973 | Eckman et al. | 296/163 |
| 3,934,924 | 1/1976 | Diliberti | 296/163 |
| 4,010,973 | 3/1977 | Heinrich | 296/163 X |
| 4,634,172 | 1/1987 | Duda | 296/163 |
| 4,862,940 | 9/1989 | Atchison | 296/163 X |
| 4,941,524 | 7/1990 | Greer | 296/163 X |
| 5,192,111 | 3/1993 | Hanemaayer | 296/163 X |
| 5,280,687 | 1/1994 | Boiteau | 296/163 X |
| 5,400,813 | 3/1995 | Swan, Jr. | 135/88.07 |

FOREIGN PATENT DOCUMENTS

| | | | |
|---|---|---|---|
| 295299 | 11/1968 | Australia | 135/88.1 |
| 80726 | 4/1963 | France | 135/88.1 |
| 7907204 | 3/1981 | Netherlands | 296/163 |
| 2207893 | 2/1989 | United Kingdom | 296/163 |

*Primary Examiner*—Joseph D. Pape
*Attorney, Agent, or Firm*—Michael I. Kroll

[57] ABSTRACT

A van canopy (10) comprising a cover (12) and a structure (14) for supporting the cover (12) onto a roof (16) of a van (18). The cover (12) will overhang the roof (16) on one side of the van (18), to protect people (20) under the cover (12) from rain and hot sun.

16 Claims, 3 Drawing Sheets

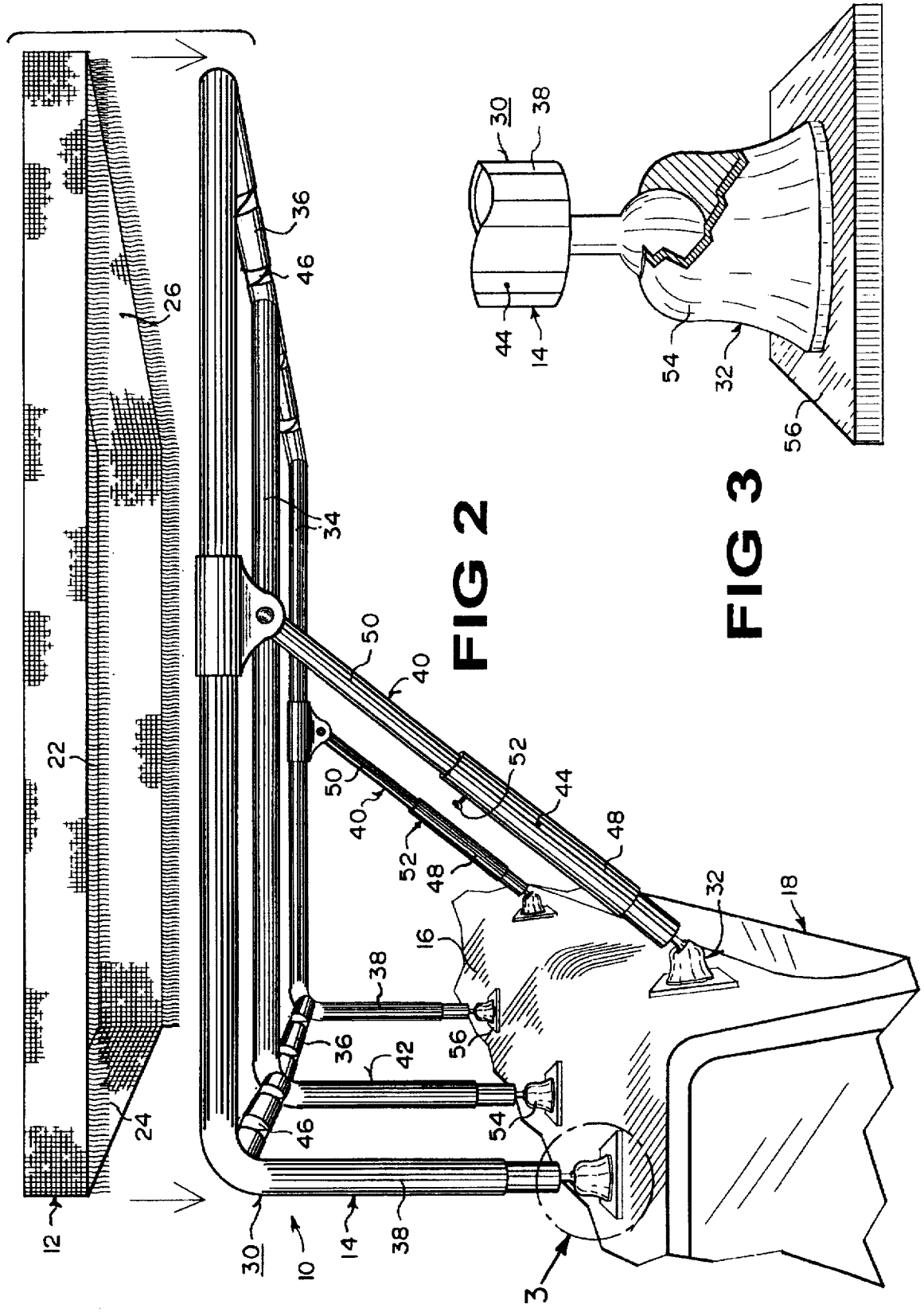

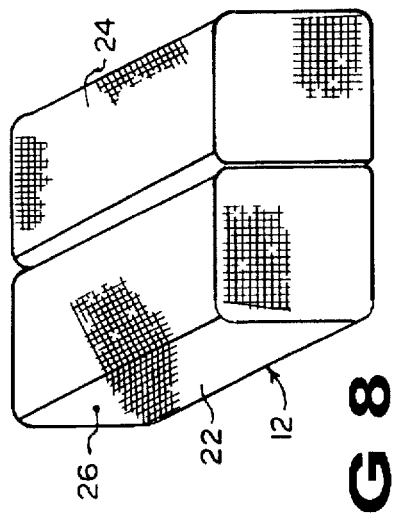
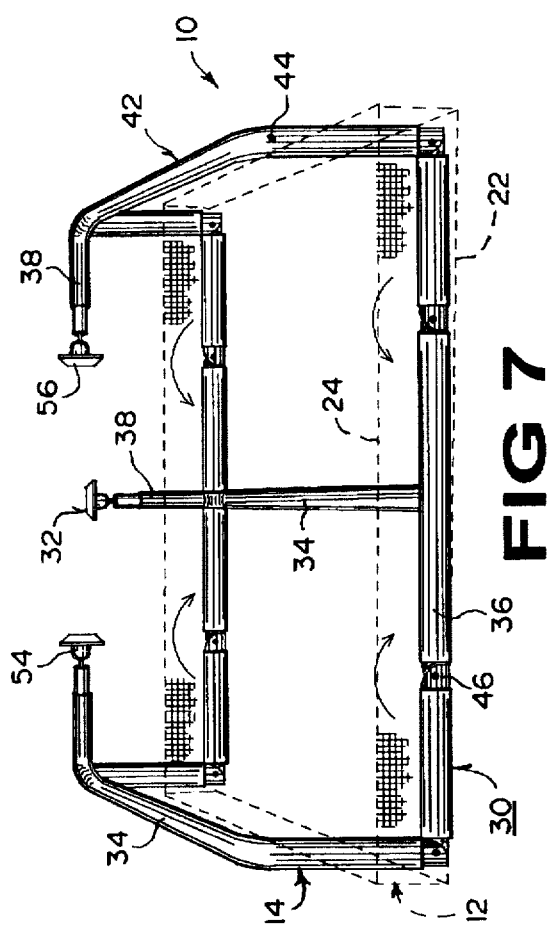
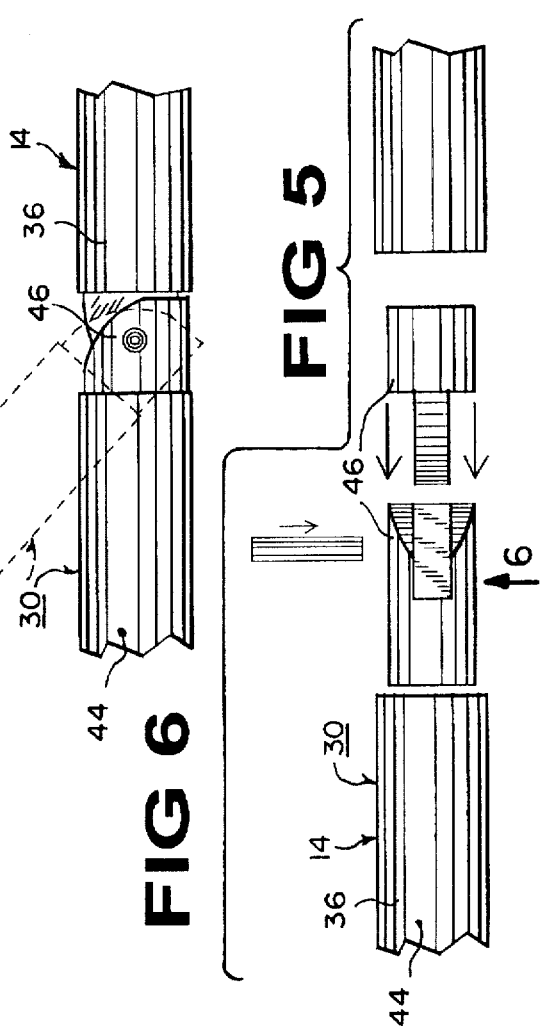
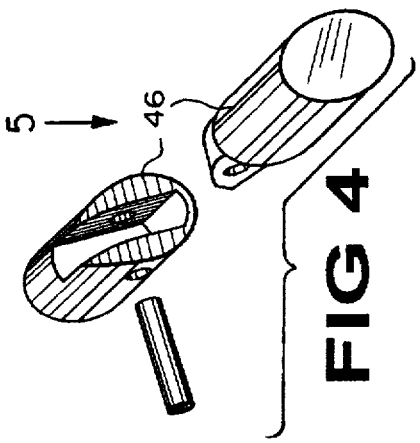

5,700,048

1
VAN CANOPY

BACKGROUND OF THE INVENTION

1. Field of the Invention

The instant invention relates generally to recreational vehicle awnings and more specifically it relates to a van canopy.

2. Description of the Prior Art

Numerous recreational vehicle awnings have been provided in prior art. For example, U.S. Pat. Nos. 4,634,172 to Duda; 4,862,940 to Atchison; 4,941,524 to Greer; 5,280,687 to Boiteau and 5,400,813 to Swan, Jr. all are illustrative of such prior art. While these units may be suitable for the particular purpose to which they address, they would not be as suitable for the purposes of the present invention as heretofore described.

DUDA, HENRY J.

FLEXIBLE HINGE RAIN SEALING MECHANISM

U.S. Pat. No. 4,634,172

A recreational vehicle which has a first longitudinally extending rail C-shaped in transverse cross-section is combined with a metal cover for a roll-up awning having a second longitudinally extending rail C-shaped in transverse cross-section. A waterproof connector between the vehicle and the metal cover includes a pair of rods. Each rod is capable of fitting within one of the first and second C-shaped rails. A synthetic organic resin strip is wrapped around each rod forming a flexible multiply connection between the rods extending substantially the entire length thereof and forming a watertight hinge therebetween. Water is then prevented from flowing between the recreational vehicle and the metal cover for the roll-up awning when the awning is extended and the synthetic organic resin strip is under tension connecting the recreational vehicle and the roll-up awning metal cover.

ATCHISON, EDWARD J.

AWNING ASSEMBLY

U.S. Pat. No. 4,862,940

An awning assembly including two elongated roller members on which awning fabric is mounted. A first roller member is mounted to the side of a vehicle or building. The second roller member is pivotally mounted to the side of the vehicle or building and can be extended therefrom or be retracted thereto. The second roller member is provided with a cover which is generally U-shaped in cross section and is strengthened in a special manner.

GREER, BRADLEY G.

AWNING HINGE

U.S. Pat. No. 4,941,524

A recreational vehicle has a retaining member extending along the side of a vehicle to retain a cover for an awning. The cover may be formed from a plurality of metallic slats pivotable relative to one another to define a housing for the awning fabric in one pivotable relationship of the slats and to define an extension of the awning fabric in a second pivotable relationship of the slats. The slat closet to the recreational vehicle in the second pivotable relationship of the cover may also have a retaining portion. A first member is provided with detaining portions at its opposite ends to be detained by the retaining member on the recreational vehicle and the retaining portion on the slat closest to the recreational vehicle. The first member may have coupling portion at an intermediate position between its opposite ends. This coupling portion co-operates with a sealing member to hold the sealing member on the first member. The sealing member may be made from a resilient material such as a vinyl. The sealing member may be provided with a first portion, such as a first flap, which extends over the retaining portion on the slat to seal the retaining portion against water leakage. The sealing member may also be provided with a second portion, such as a second flap, which extends over the retaining member on the recreational vehicle to seal the retaining member against water leakage.

BOITEAU, CHARLES C.

EXTENDED AWNING FOR SLIDE-OUTS

U.S. Pat. No. 5,280,687

A retractable awning for recreational vehicle slide-outs prevents rain, snow and other debris from collecting on the roof of the slide-out. The awning is provided with an inner edge secured to the adjacent wall of the recreational vehicle immediately above the slide-out roof. The opposite edge of the awning is connected to a roller journaled on arms pivotally mounted on the outer face of the slide-out. The arms provide oppositely extending lateral projections, so that they can support a roller having a length greater than the spacing between the arms. Since the roller must be wider than the awning, the roller has a length exceeding the width of the slide-out roof, and the awning has a width at least equal to the width of the slide-out roof, so that full coverage of the slide-out roof is provided. The roller support arms can be pivoted down to provide a typical awning for a window provided in the slide-out.

SWAN, JR., RONALD L.

AWNING FOR RECREATIONAL VEHICLES

U.S. Pat. No. 5,440,813

An awning which is universally adaptable to nearly all passenger vehicles, as well as recreational vehicles, is disclosed. A tarp is connected through roof tethers, either to a roof rack or vehicle gutter at one end, and is supported by support poles and tethers and anchored to the ground at the other end. The support poles are collapsible, and the tarp is made of a relatively lightweight material. The tethers are long and short and have loops and spring snap hooks or gutter clamps at opposite ends for quick attachment to the tarp and ground supports and to an automobile roof rack or gutter. The tarp, collapsed poles and tethers are self-contained within a stuff sack for easy portability.

SUMMARY OF THE INVENTION

A primary object of the present invention is to provide a van canopy that will overcome the shortcomings of the prior art devices.

Another object is to provide a van canopy that contains a framework with magnetic ball joint feet to engage with and overhang the roof of the van, so that the framework can support a cover to protect people from rain and/or sun.

3

An additional object is to provide a van canopy in which the framework can be collapsed and the cover folded up for storage purposes.

A further object is to provide a van canopy that is simple and easy to use.

A still further object is to provide a van canopy that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 2 is an enlarged perspective view taken in the direction of arrow 2 in FIG. 1, with the cover exploded from the framework and the van broken away.

FIG. 3 is a further enlarged perspective view of the area in FIG. 2 as indicated by arrow 3, with parts broken away and in section.

FIG. 4 is an exploded perspective view of one hinge in the framework.

FIG. 5 is an exploded top view taken in the direction of arrow 5 in FIG. 4, showing a portion of the associated tubing.

FIG. 6 is an assembled side view as indicated by arrow 6 in FIG. 5.

FIG. 7 is an inverted perspective view of the instant invention with the cover shown in dotted lines, the support arms removed therefrom and the framework partly collapsed.

FIG. 8 is a perspective view of the cover shown in folded up configuration.

Similar reference characters denote corresponding features consistently throughout the attached drawings.

DETAILED DESCRIPTION OF THE PREFERRED EMBODIMENTS

Figure 1:
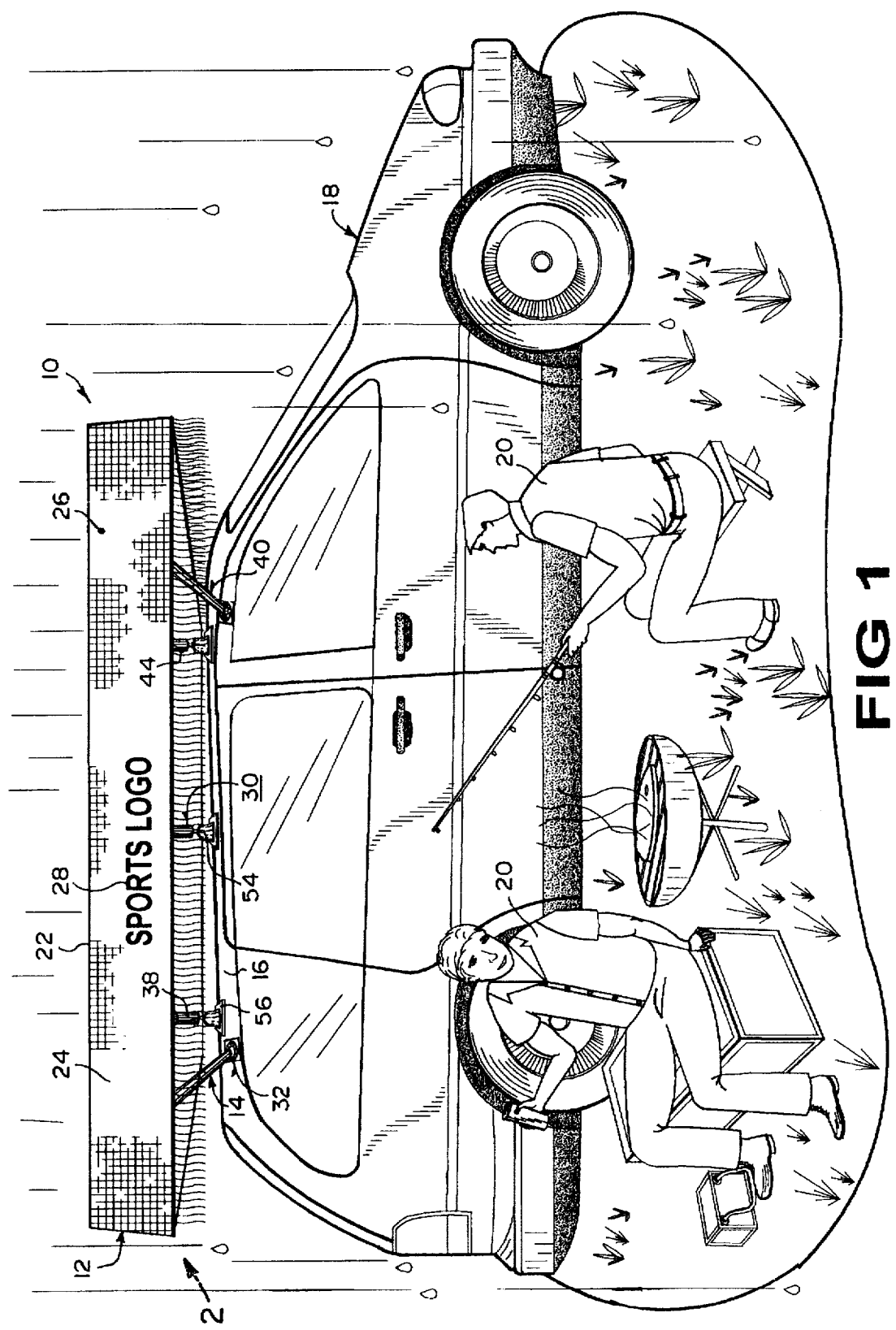
FIG. 1 is a perspective view showing the instant invention in use on a van, with people sitting and being protected from the rain.

Turning now descriptively to the drawings, in which similar reference characters denote similar elements throughout the several views, FIGS. 1, 2 and 7 illustrate a van canopy 10 comprising a cover 12 and a structure 14, for supporting the cover 12 onto a roof 16 of a van 18. The cover 12 will overhang the roof 16 on one side of the van 28, to protect people 20 under the cover 12 from rain and hot sun.

The cover 12 is a flexible sheet 22 sized to fit over the supporting structure 14. A flexible skirt 24 extends downwardly about the perimeter of the flexible sheet 22, so that the flexible skirt 24 will fit about the support structure 14. The flexible sheet 22 and the flexible skirt 24 are integral and fabricated out of nylon fabric 26, which can be folded up for storage when not in use, as shown in FIG. 8. The flexible skirt 24 can also contain indicia 28 printed thereon, such as a team log, as shown in FIG. 1.

The supporting structure 14 consists of a framework 30. A facility 32 is for maintaining the framework 30 onto the roof 16 of the van 18, so that the framework 30 will overhang the roof 16 and be held thereto in a removable manner.

The framework 30 includes three parallel spaced apart horizontal rods 34. Two crossbars 36 are provided, in which both extend horizontally across opposite ends of the horizontal rods 34. Three vertical legs 38 all extend downwardly from one end of the horizontal rods 34. Two support arms 40 are both pivotally connected at 42 at upper ends, midway between the two outermost horizontal rods 34.

The three horizontal rods 34 and the three vertical legs 38 are integral. Each rod 34 with its respective leg 38 will form an L-shaped strut member 42, as best seen in FIGS. 2 and 7. The framework 30 is fabricated out of aluminum tubing 44.

As best seen in FIGS. 4, 5 and 6, each crossbar 36 includes a plurality of hinges 46, so that the framework 30 can be collapsed for storage when not in use. Each support arm 40, as best shown in FIG. 2, is adjustable and contains a lower segment 48 and an upper segment 50, which telescopes into the lower segment 48. A setscrew 52 on the lower segment 48 engages with the upper segment 50, so that the total length of the support arm 40 may be easily adjusted.

The maintaining facility 32 includes five ball joint feet 54. Three of the ball joint feet 54 are connected in a swiveling manner to lower ends of the three vertical legs 38. Two of the ball joint feet 54 are connected in a swiveling manner to lower ends of the two support arms 40. Five magnetic pads 56 are provided. Each magnetic pad 56 is affixed to one ball foot 54. The magnetic pads 56 will magnetically stick onto the roof 16 of the van 18.

To use the van canopy 10, the following steps should be taken:

1. Straighten the cross bars 36 by opening the hinges 46, so that the framework 30 is in the proper position.
2. Place the magnetic pads 56 on the three ball joint feet 54 of the three vertical legs 38 onto the roof 16 of the van 18, so that the horizontal rods 34 overhang the roof 16.
3. Adjust the upper segments 50 of the support arms 40 with the lower segments 48.
4. Tighten the setscrews 52 when the lower segments 48 are in the right position with the side of the roof 16.
5. Place the magnetic pads 56 on the two ball joint feet 54 of the two support arms 40 against the sides of the roof 16.
6. Position the flexible skirt 24 on the cover 12 over the horizontal rods 34 of the supporting structure 14.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A van canopy comprising:
   a) a cover; and
   b) means for supporting said cover onto a roof of a van, so that said cover will overhang the roof on one side of the van to protect people under said cover from rain and hot sun, said supporting means including a framework and means for maintaining said framework onto the roof of the van, so that said framework will overhang the roof and be held thereto in a removable manner said framework including:
      i) three parallel spaced apart horizontal rods;
      ii) two crossbars, both extending horizontally across opposite ends of said horizontal rods;
      iii) three vertical legs, all extending downwardly from one end of said horizontal rods; and
      iv) two suport arms, both pivotally connected at upper ends midway between said two outermost horizontal rods.

2. A van canopy as recited in claim 1, wherein said cover is a flexible sheet sized to fit over said supporting means.

3. A van canopy as recited in claim 2, wherein said cover includes a flexible skirt extending downwardly about the perimeter of said flexible sheet, so that said flexible skirt will fit about said support means.

4. A van canopy as recited in claim 3, wherein said flexible sheet and said flexible skirt are integral and fabricated out of nylon fabric, which can be folded up for storage when not in use.

5. A van canopy as recited in claim 3, wherein said flexible skirt includes indicia printed thereon.

6. A van canopy as recited in claim 1, wherein said three horizontal rods and said three vertical legs are integral, in which each said rod with its said respective leg will form an L-shaped strut member.

7. A van canopy as recited in claim 1, wherein said framework is fabricated out of aluminum tubing.

8. A van canopy as recited in claim 1, wherein each said crossbar includes a plurality of hinges, so that said framework can be collapsed for storage when not in use.

9. A van canopy as recited in claim 1, wherein each said support arm is adjustable and includes:
   a) a lower segment;
   b) an upper segment which telescopes into said lower segment; and
   c) a setscrew on said lower segment which engages with said upper segment, so that the total length of said support arm may be easily adjusted.

10. A van canopy as recited in claim 1, wherein said maintaining means includes:
    a) five ball joint feet, in which three of said ball joint feet are connected in a swiveling manner to lower ends of said three vertical legs, while two of said ball joint feet are connected in a swiveling manner to lower ends of said two support arms; and
    b) five magnetic pads, each affixed to one said ball foot, so that said magnetic pads will magnetically stick onto the roof of the van.

11. A van canopy as recited in claim 4, wherein said flexible skirt includes indicia thereon.

12. A van canopy as recited in claim 11, wherein said three horizontal rods and said three vertical legs are integral, in which each said rod with its said respective leg will form an L-shaped strut member.

13. A van canopy as recited in claim 12, wherein said framework is fabricated out of aluminum tubing.

14. A van canopy as recited in claim 13, wherein each said crossbar includes a plurality of hinges, so that said framework can be collapsed for storage when not in use.

15. A van canopy as recited in claim 14, wherein each said support arm is adjustable and includes:
    a) a lower segment;
    b) an upper segment which telescopes into said lower segment; and
    c) a setscrew on said lower segment which engages with said upper segment, so that the total length of said support arm may be easily adjusted.

16. A van canopy as recited in claim 15, wherein said maintaining means includes:
    a) five ball joint feet, in which three of said ball joint feet are connected in a swiveling manner to lower ends of said three vertical legs, while two of said ball joint feet are connected in a swiveling manner to lower ends of said two support arms; and
    b) five magnetic pads, each affixed to one said ball foot, so that said magnetic pads will magnetically stick onto the roof of the van.

* * * * *